Aug. 28, 1928.

W. D. CALLAN 1,682,596

DEHYDRATING APPARATUS

Original Filed May 5, 1920    5 Sheets-Sheet 3

INVENTOR
WILLIAM D. CALLAN.
BY
Paul & Paul
HIS ATTORNEYS.

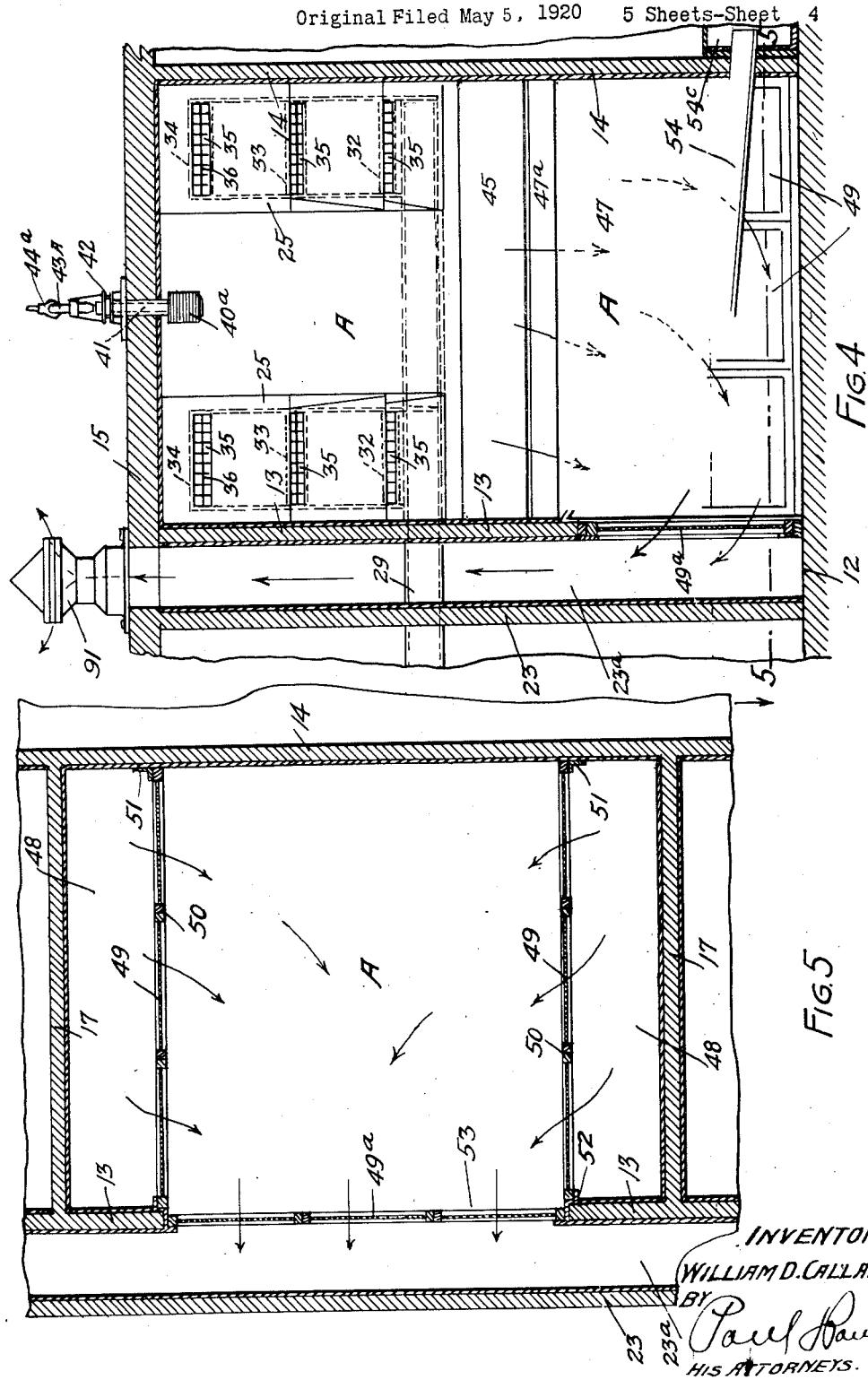

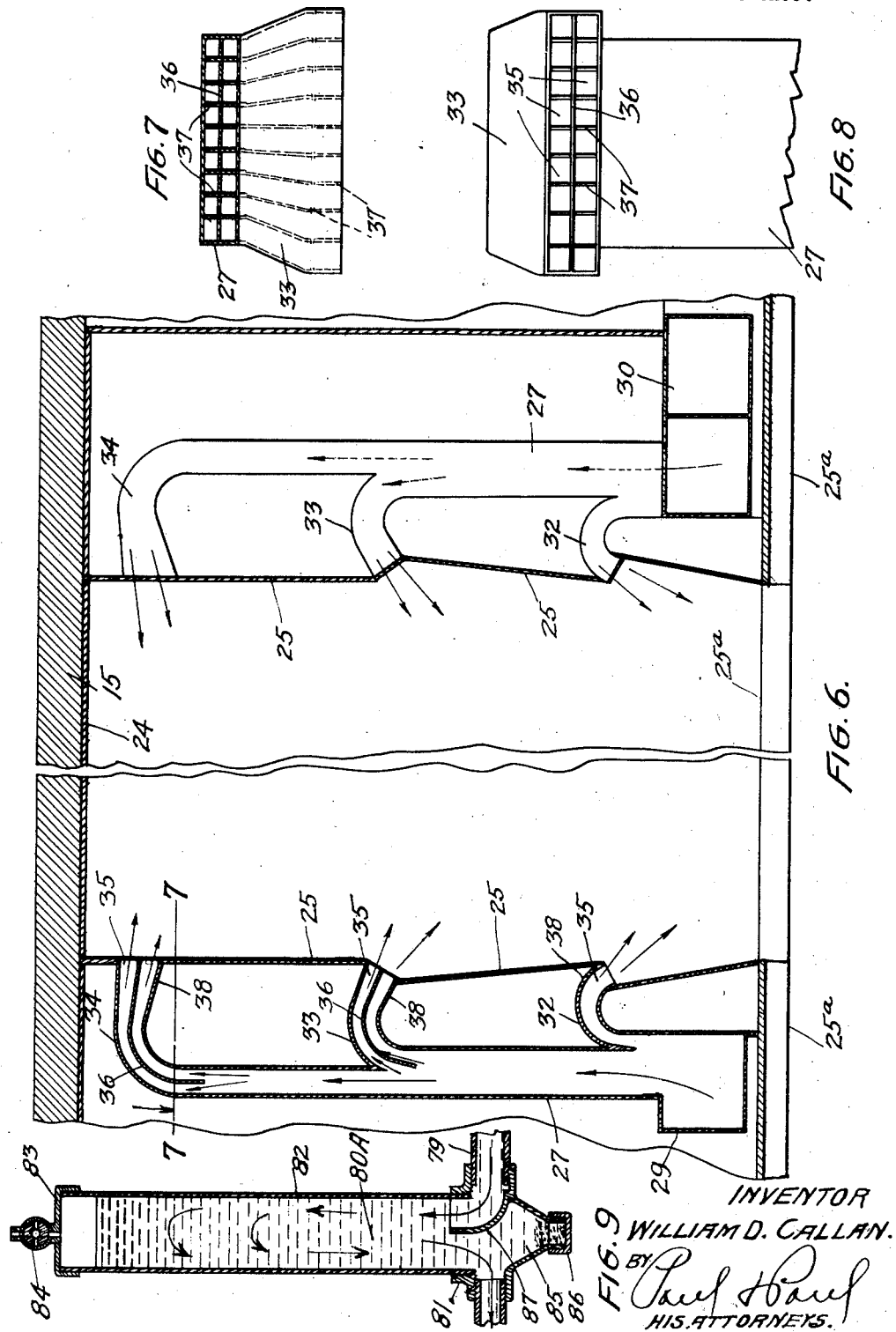

Patented Aug. 28, 1928.

1,682,596

UNITED STATES PATENT OFFICE.

WILLIAM D. CALLAN, OF DULUTH, MINNESOTA, ASSIGNOR TO ECONOMIC POWDERED PRODUCTS COMPANY, OF MINNEAPOLIS, MINNESOTA, A CORPORATION OF DELAWARE.

DEHYDRATING APPARATUS.

Application filed May 5, 1920, Serial No. 379,026. Renewed July 5, 1927.

My invention relates to apparatus for removing the water contained in milk, and other similar fluids, and collecting the residue or basic substance in a powdered, granular or other form. The object of my invention is particularly to provide an apparatus that will be sanitary, efficient, and of large capacity for condensing and powdering milk, and that will be simple of construction and require but little attention in operation.

My invention consists generally in improvements in a two stage process of dehydrating milk or other fluid viz: By first directing and distributing, within suitable cells, opposing currents of heated air into a spray or mist of the liquid, produced in the cells, absorbing the largest portion of the water by the air currents, and settling the condensed fluid by precipitation and gravitation into suitable conductors; and second, by presenting the same process with the condensed fluid, to absorb the remaining portion of the water by the heated air, collect the dried or powdered basic substance of the fluid by precipitation, and separate any remaining percentage of the substance from the air before it is discharged from the cell.

My invention consists in certain constructions and combinations as will hereinafter be described and particularly pointed out in the claims.

In the accompanying drawings, forming part of the specification,

Figure 1 is a longitudinal vertical section, with parts in elevation, of a condensing and powdering apparatus constructed according to my invention.

Figure 2 is a longitudinal horizontal section, with parts in elevation, on the line 2—2 of Figure 1, Figure 3 is a similar section, with parts in elevation, on the line 3—3 of Figure 1, Figure 4 is a vertical cross section of the condensing cell, with parts in elevation, taken on the line 4—4 of Figure 1, Figure 5 is a horizontal section on the line 5—5 of Figure 4, Figure 6 is a vertical section on the line 6—6 of Figure 2, illustrating the way in which the hot air currents, for evaporating and carrying away the moisture in the milk, enter the dehydrating chambers.

Figure 7 is a plan sectional view on the line 7—7 of Figure 6 through one of the air distributing ducts by which the air enters the dehydrating chambers.

Figure 8 is an end elevation of the dust shown in Figure 7,

Figure 9 is a sectional detail view.

Figure 1:
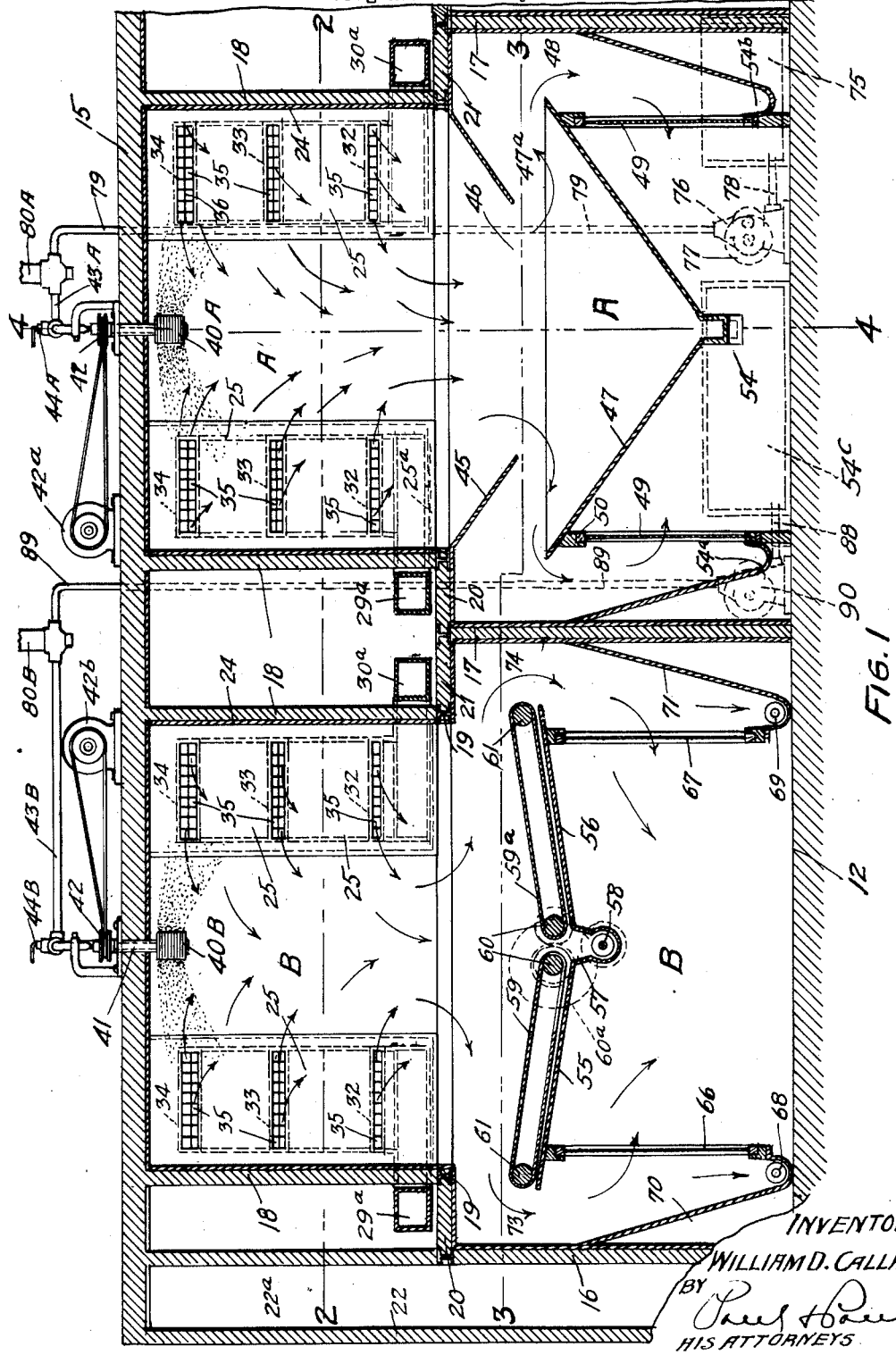
Figure 2:
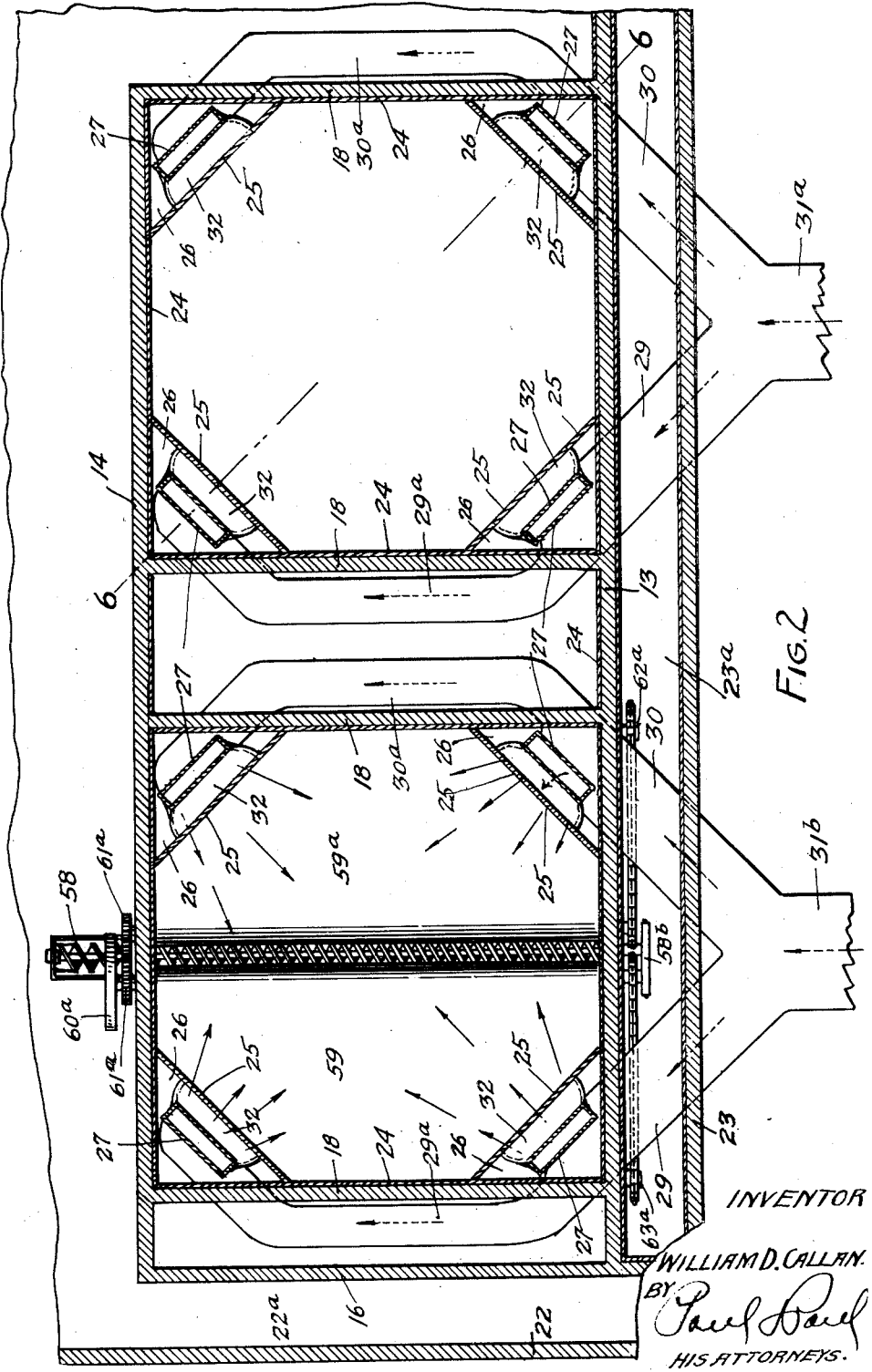

In the drawings A represents the primary condensing cell, in which about two thirds of the water is removed from the milk, and B is the final drying and powdering cell of the basic milk product. The cells A and B are shown to be of the same size and it will be understood that one powdering cell ordinarily has sufficient capacity to finish the product from two condensing cells of the same size, one of which is shown on the drawings. The cell structure is erected preferably on a concrete floor foundation 12 and consists of the side walls 13 and 14 extending from the floor 12 to the ceiling 15, the lower cross walls 16 and 17, and the upper cross walls 18, all of said cross walls joining the side walls 13 and 14. The upper cell compartments A' and B', bounded by the walls 18, are shorter that the lower compartments of the cells and transverse girders 19 upon which the upper walls 18 rests are embedded in the side walls 13 and 14. Intermediate floor sections 20 and 21 are supported by the girders 19 and connect the lower cross walls 16 and 17 to the upper cross walls 18. The end cross wall 16 extends from the floor to the ceiling and an outer end wall 22 spaced from the wall 16 forms an air space 22ª along the cell B, and an outer wall 23 spaced from the side wall 13 forms a longitudinal closed passage 23ª. The walls are preferably constructed of hollow tile or other material impervious to heat, and are preferably covered with a non-heat conducting sheet 24 of asbestos or other similar material. The upper cell compartments are identical in construction and are provided with the vertical walls 25 extending diagonally from the side to the cross walls across each corner of the cells, and having bottom plates 25ª, thus transforming the cells from a rectangular to an octagonal form and providing a closed triangular chamber 26 in each corner of the cells. Through these chambers pass vertical air conductors 27, communicating with horizontal branch ducts 29 and 30 coming from the main trunk ducts 31ª and 31ᵇ. The air conductors 27 branch off in curved or goose neck nozzles 32, 33 and 34, (see Figures 6 to 8) preferably pointing slightly downwards and towards the center of the cells and being provided with discharge openings 35, leading through the diagonal walls 25. The nozzles 32, 33 and 34, branching off from the conductors 27, increase in area from the bottom upwards and are provided with a curved baffle plate 36 and a series of partitions 37 for the purpose of breaking up and diverting the air stream into a series of distributing and eddying currents of air. The nozzles preferably have flaring discharge ends 38 from which the air currents emerge in different directions converging generally from opposite sides to the center of the cell and in a downward direction.

Figure 3:
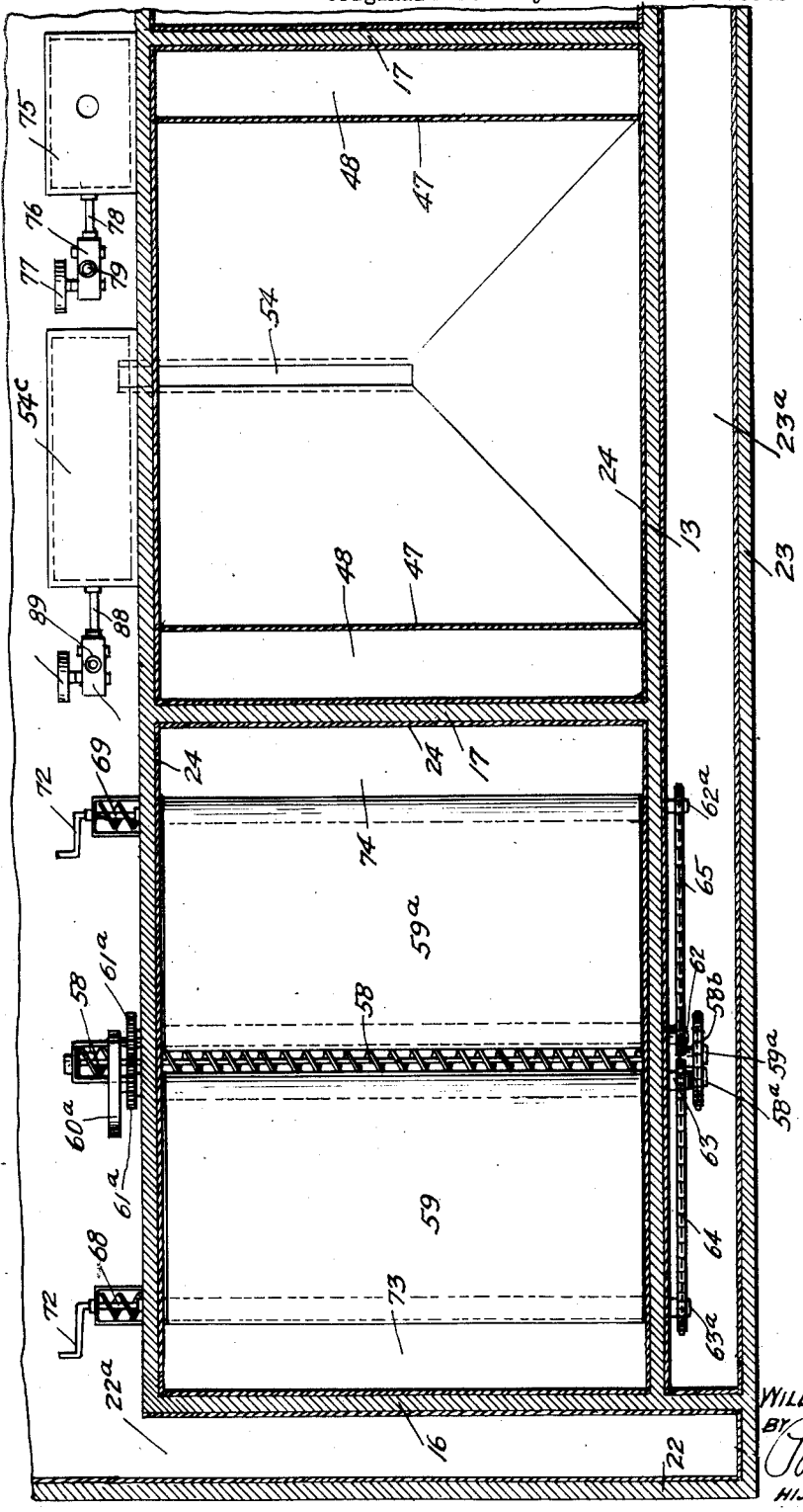

It will be understood that the air is first heated to a certain temperature and inducted under suitable pressure through the trunk ducts $31^a$ and $31^b$ and branch ducts 29 and 30 to the distributing conductors 27 and 28 by means not disclosed in the drawings as these means form no part of the present invention. Through the ceiling 15 of the cells which generally constitutes the working floor of the plant, and in the center of the upper cells A' and B' are projected the sprayers $40^A$ and $40^B$ which may be of any suitable construction but preferably consist of a series of slightly separated annular spraying plates provided with holes and connected to a hollow rotating shaft 41 through which the fluid enters to the spraying plates. Driving pulleys 42 driven from any suitable, as electric motors $42^a$ and $42^b$, are provided for the shafts 41 and supply pipes $43^A$ and $43^B$ having regulating valves $44^A$ and $44^B$, deliver the fluid to the hollow shafts 41. Below the upper cell compartment A' is attached a converging hopper 45 having a central constricted opening 46 through which the vaporized fluid, broken up and thoroughly mixed with air into a saturated vapor, enters the lower condensing chamber or compartment of cell A. A gathering hopper 47 having an outlet 48 is supported on the side walls 13 and 14 some distance below the hopper 45, leaving an open air space $47^a$ forming a horizontally extending restricted air passage between the two hoppers and air spaces 48 between the hopper 47 and cross walls 16 and 17. Closely woven fabric or screens 49 (see Figures 1, 4 and 5) supported vertically in suitable frames 50 are secured to two sides of the hopper 47, to the floor 12 and side walls 13 and 14 by means of angle bars 51 and 52, and a similar screen $49^a$ is secured in an opening 53 in the wall 13 below the hopper 47. The moisture laden air coming in large volume from the upper compartment cell A' and passing through the restricted opening 46 in the hopper 45, gives off the heavier, or more saturated portion of the vapor, containing the basic fluid substance, which condenses and settles by precipitation, and gravity to the bottom of the hopper 47 where it is collected and carried away by an inclined trough 54. The water laden air freed from the heavier material is compelled to pass out between the hoppers 45 and 47 through the air space $47^a$ downwards through the air spaces 48, through the screens 49 and screens $49^a$ to the passageway $23^a$ as indicated by the arrows. In its passage downwards and through the screens the water is given off and, collecting on the concrete floor of the cell, is run off in any well known manner not shown. Any condensed fluid that may collect on the screens 49 and $49^a$, gravitates to the troughs $54^a$ and $54^b$, from which it may be periodically drained off and saved. The proportion of moisture removed from the milk or other fluid by this process is substantially about ⅔ of the total water contents of the fluid, and the condensed fluid is then discharged from the trough 54 into a container $54^c$ from which it is pumped to the spraying apparatus $40^B$ in the final dehydrating and powdering cell B as will hereinafter be more particularly described. Below the upper dehydrating compartment of cell B and spaced below the floor sections 20 and 21, (see Figures 1 and 3) are mounted plates or sheets 55 and 56 joining the side walls 13 and 14, and inclined towards the center of the cell, terminating in a hopper 57 in which is mounted a spiral conveyor 58. Similarly inclined apron conveyors 59 and $59^a$ are mounted on rollers 60 and 61, and driven in the direction of the arrows in Figures 1 and 3. These rollers as well as the conveyor 58 are journalled in suitable bearing brackets in the side walls 13 and 14 and are driven from any suitable source of power by means of a driving pulley $60^a$, gears $61^a$ and sprocket wheels $62^a$, 63 and $63^a$ and chains 64 and 65. The conveyor 58 is driven from the roller 60 by sprocket wheels $58^a$ and $59^a$ and chain $58^b$. Vertical screens 66 and 67 are attached to the sheets 55 and 56 and walls 13 and 14 substantially as in cell A and a screen (not shown) corresponding to the screen $49^a$ in this cell is secured in the wall 13 below the conveyors. The screens 66 and 67, instead of being secured directly to the floor are connected to the casing of spiral conveyors 68 and 69, attached to the floor and inclined gathering shields 70 and 71 are attached to the conveyor casings and to the cross walls 16 and 17. The shields and conveyors extend the full width of the cell and the conveyors extend through the side wall 14 outside of which they are preferably provided with operating handles 72, (see Figure 3). As the condensed milk emerges from the sprayer $40^B$ in the final dehydrating and powdering compartment of cell B, a mist is formed in the upper compartment B' of cell B and the hot air currents, streaming into the chamber from opposite directions thoroughly absorb the remaining moisture in the milk in the form of a steam and separates the water completely from the basic milk product which gravitates and falls upon the conveying aprons 59 and 59ª in the form of a dry powder. The moist hot air passes outwards and downwards through the air spaces 73 and 74, the screens 66 and 67 and a screen similar to 49ª in cell A, to the passage 23ª. Any remaining milk product not thoroughly dried that may have passed with the air through the air spaces 73 and 74, will, in the downward passage and when coming in contact with the screens 66 and 67, quickly dry and gravitate to the conveyors 68 and 69 from which the powdered product may be removed periodically by the operator by turning the conveyor handles 72. The bulk of the dried and powdered product collecting on the aprons 59 and 59ª will be conducted to the conveyor 58 by which it will automatically be conveyed out of the cell. In the operation of a complete milk dehydrating plant the milk is first delivered to a receiving tank or container 75 (see Figure 1) arranged upon the floor 12 of the plant which floor is preferably below the ground line and in the basement of the plant. A sanitary pump 76, which may be of the rotary or any other type and may be driven by means of a pulley 77 elevates the milk from the tank 75, through pipes 78 and 79 to the supply pipe 43ᴬ for the sprayer 40ᴬ. The motor or engine (not shown) driving the pump 76 is provided with a suitable pressure governor, which maintains a uniform pumping pressure in the pipe 79, and to further provide a reserve against possible fluctuations in the pressure and assure uniformity in the delivery of the milk to the sprayers, I provide a regulating reservoir 80ᴬ (see Figure 9) above the inlet to the sprayers. This reservoir consists preferably of a nipple 81 in which is screwed a vertical pipe 82, having a cap or cover 83 with a valve 84 for escape of air when the dehydrating operation is commenced. At the bottom the pipe nipple 81 terminates in a hoppered settling chamber 85, closed at the bottom with a removable cap 86 and just above the settling chamber 85 are connected the horizontal inlet pipe 79 and the horizontal pipe 43ᴬ supplying the sprayer 40ᴬ. A deflecting plate 87, directing the incoming stream of milk upwards in the pipe 82, from the inlet pipe 79 is arranged above the settling chamber 85. The capacity of the pump 76 is normally greater than the capacity of the condensing cell and when the condensing operation is started, the reservoir 80ᴬ at first being empty will gradually fill and as much of the air as may be desired may be let out of the reservoir by opening the valve 84. This valve is then closed and the milk flowing in from the pipe 79, circulates upward and downward through the reservoir 80ᴬ and flows out through the pipe 43ᴬ to the sprayer 40ᴬ, regulated in volume by the valve 44ᴬ. Any foreign matter will gravitate to the settling chamber 85, from which it may be periodically removed by the operator. It will be understood that the pressure governor on the motor regulates the flow of milk to the reservoir 80ᴬ and keeps it under a certain pressure and any possible fluctuations will be taken up and compensated for by the reservoir fluid in the pipe 82 aided by the cushioned air above the fluid in the pipe. The condensed milk from lower compartment of cell A discharging into the container 54ᶜ is drawn from this container and elevated, through pipes 88 and 89, to the sprayer 40ᴮ of the final dehydrating cell B, by means of a pump 90 similar in function to the pump 76. The milk, in its flow to the sprayer 40ᴮ passes through a regulating reservoir 80ᴮ similar in construction and function to the reservoir 80 and as the milk emerges from this reservoir it passes through the supply pipe 43ᴮ and regulating valve 44ᴮ to the sprayer 40ᴮ and into the dehydrating chamber B for the final dehydrating operation as heretofore described. The air from both the condensing and powdering cell A and B, passing from the cells into the passage 23ª escapes from this passage to the outer atmosphere through suitable ventilators 91 arranged at intervals at the top of the passage. It is evident that various modifications may be made in the details of construction of the apparatus without departing from the principle and scope of the invention and I do not therefore confine myself strictly to the construction as shown.

I claim as my invention:

1. A dehydrating cell for fluids comprising an upper and lower compartment, means for directing currents of heated air into said upper compartment, a fluid sprayer in said upper compartment, said cell having a horizontally extending restricted air passage from the lower portion of said upper compartment to said lower compartment, collecting means below said passage and air ducts passing downwardly around said collecting means and connected with said restricted passage.

2. A dehydrating cell for milk or other fluids comprising an upper and a lower compartment, means for directing currents of heated air into said upper compartment, a fluid sprayer in said upper compartment, said cell having an air passage from the upper to the lower compartment, between the adjacent ends of the two compartments, collecting means below said air passage, air ducts around said collecting means, screens below said collecting means through which the air passes from said ducts, and means for collecting the material separated from the air by said screens.

3. A dehydrating cell for fluids comprising an upper and lower compartment, means for directing currents of heated air into the upper compartment, a liquid sprayer positioned to deliver a spray into the path of the currents of heated air, said upper and lower compartment having a constricted passage between them at their adjacent ends, a hopper device beneath said constricted passage for receiving the condensed material from said passage, an air circulating passage being provided above said hopper device for receiving the currents of air from said constricted passage, and means beneath said hopper device for screening said currents of air.

4. In an apparatus for dehydrating fluids, a powdering cell, means for spraying material in the upper portion thereof, means in the upper portion of the cell for delivering currents of heated air into the spray of the material to be powdered, a table mounted in the lower portion of said cell and inwardly and downwardly inclined, a conveying means communicating with the inner portion of said table, gathering belts operating over said table for delivering the powdered material to said conveyor, the currents of air from the upper portion of said cell flowing downwardly and over the belts, and means positioned below the plane of the belts for screening said currents of air.

5. In an apparatus for dehydrating fluids, a cell, means for spraying material in the upper portion thereof, means in the upper portion of the cell for delivering currents of heated air to a spray of the material to be powdered, a table mounted in the lower portion of said cell and inwardly and downwardly inclined, a conveyer for receiving the material positioned at the lower end of said table, gathering means operating over said table, a passage being provided above said table for the currents of air flowing from the upper portion of said cell, screens arranged below said table for screening said currents of air, and means for collecting the material separated from the currents of air by said screens.

In witness whereof, I have hereunto set my hand this 29th day of April 1920.

WILLIAM D. CALLAN.